United States Patent [19]

Welch

[11] 4,237,368
[45] Dec. 2, 1980

[54] TEMPERATURE SENSOR FOR GLASS-CERAMIC COOKTOP

[75] Inventor: Stanley B. Welch, Louisville, Ky.

[73] Assignee: General Electric Company, Louisville, Ky.

[21] Appl. No.: 912,162

[22] Filed: Jun. 2, 1978

[51] Int. Cl.³ .............................................. H05B 3/00
[52] U.S. Cl. .................................... 219/449; 338/25; 338/22 R; 219/464; 219/504
[58] Field of Search ............... 219/449, 504, 505, 450; 338/22 R, 22 SD, 23; 73/362 R, 362 AR, 362 SC; 354/52, 62, 64

[56] References Cited

U.S. PATENT DOCUMENTS

| | | | |
|---|---|---|---|
| 2,921,174 | 1/1960 | Welch | 338/22 R |
| 3,477,019 | 11/1969 | Hartmann | 354/52 |
| 3,549,862 | 12/1970 | Holtkamp et al. | 217/482 |
| 3,622,754 | 11/1971 | Hurko | 219/464 |
| 3,636,309 | 1/1972 | Deaton et al. | 219/464 |
| 3,710,076 | 1/1973 | Frazier | 219/449 |
| 3,786,390 | 1/1974 | Kristen | 338/22 R |
| 3,947,658 | 3/1976 | Sato et al. | 219/504 |
| 4,092,520 | 5/1978 | Holmes et al. | 219/504 |

FOREIGN PATENT DOCUMENTS 2355811 5/1975 Fed. Rep. of Germany ........... 219/449

Primary Examiner—Roy N. Envall, Jr.
Assistant Examiner—Bernard Roskoski
Attorney, Agent, or Firm—Bernard J. Lacomis; Radford M. Reams

[57] ABSTRACT

A glass-ceramic cooktop surface is provided with a temperature sensor integral with the glass ceramic plate of the cooktop. The temperature sensor utilizes the temperature resistance characteristic of the glass ceramic plate as a means of monitoring the temperature of the plate and is formed in the heated areas of the glass-ceramic plate. The sensor comprises pairs of metallized conductive strips fired to the underside of the plate and terminated in a cool region of the plate. A continuity resistor is provided at the termination point of each pair of strips to distinguish between cold glass conditions and a defective sensor. One strip of each pair is connected to a further metallized strip which surrounds the periphery of the glass and forms a common ground for a heating unit control circuit and is also used as a broken glass detector. Each sensor forms one leg of an AC voltage divider and is connected to an associated control circuit. The output of the voltage divider is applied to two voltage comparators having a common output connected to operate a relay to control heater power to the "burners" of the cooktop which may be open coil heaters or film heaters.

8 Claims, 8 Drawing Figures

TEMPERATURE SENSOR FOR GLASS-CERAMIC COOKTOP

CROSS REFERENCE TO RELATED APPLICATIONS

Specific circuitry suitable for use with the sensor of the present invention is the subject matter of a commonly-assigned copending application, Ser. No. 912,152, filed June 2, 1979 by Juan de J. Serrano, entitled "CONTROL CIRCUIT FOR AC OPERATED GLASS-CERAMIC COOKTOP TEMPERATURE SENSOR". An improvement to the sensor is the subject matter of another commonly-assigned copending application, Ser. No. 912,161, filed June 2, 1979, now abandoned, by Stanley B. Welch and Juan de J. Serrano, entitled "TEMPERATURE SENSOR FOR GLASS-CERAMIC COOKTOP EMPLOYING AC EXCITATION".

BACKGROUND OF THE INVENTION

1. Field of the Invention

This invention relates to the range art and particularly to the use of temperature sensors to monitor the temperature of a glass-ceramic cooktop surface and to control power to the heating units of a glass-ceramic cooktop surface.

2. Description of the Prior Art

In order to improve the cleanability of cooktops of domestic ranges as well as built-in counter cooktops, the standard porcelain enamel cooktop surface with separate electrical heating elements or gas burners has been replaced in certain models of appliances by high resistivity continuous glass-ceramic plates, which are heated by either electric or gas heating units disposed beneath the cooktop surface of the continuous glass ceramic plate. Such plates are of generally milk-white, opaque, glass-ceramic or cystalline glass material sold under trademarks as "PYROCERAM", "CER-VIT", and "HERCUVIT". This glass-ceramic material has a low thermal expansion coefficient, and it has a smooth top surface of almost polished glass finish or texture that presents a pleasing appearance and is also readily cleanable. The smooth continuous surface prevents the drainage of spillovers underneath the cooktop in the area of the heating elements.

It has been long known that the electrical resistance of the glass-ceramic material used for such cooktops decreases in a predictable manner with increasing temperature. However, advantages of this characteristic has not heretofore been taken in the manner of the present invention.

Such smooth surface glass-ceramic cooktops have found wide acceptance and have become very popular for use on both electric and gas ranges of a variety of types.

For example, in U.S. Pat. No. 3,710,076 to Frazier, there is disclosed a single-plate, utensil-supporting, glass-ceramic cooktop having a plurality of open coil heating elements positioned therebeneath to provide several areas for surface cooking. In this system, the main mode of heat transfer between the open coil heater and the glass-ceramic cooktop is by radiation since the heater is vertically spaced from the cooktop by an air gap. In order to produce high radiant heat to obtain acceptable heating rates, the heater coil is operated at relatively high temperatures on the order of 1800° to 2000° F. at a wattage rating of about 2000 watts at 236 volts AC. Because of the high operating temperatures, it is essential to monitor the temperature of cooktop and control heater power to optimize thermal and cooking efficiency.

U.S. Pat. No. 3,710,076 to Frazier additionally discloses a temperature sensor for sensing the temperature of the surface to provide a control signal for adjusting the heat radiation by an electrical resistance heating element. In the aforementioned Frazier patent, a divider extends centrally across the interior of the container or box-like cooking unit and the temperature sensor has at least one flat side supported in a channel provided in the upper surface of the divider with the flat side of the sensor in firm physical contact with the underside of the cooktop.

Such sensing units suffer from several disadvantages. For example, response time is slow because the sensor is positioned to the side of the heated area and away from the region of maximum glass temperature. This is so because the glass-ceramic material has a high thermal mass, thus a slow response requiring a longer time to heat up and cool down. Further, the heat is stored in the glass-ceramic plate as well as in the insulating support block or pad for the heating element and, because the region of maximum glass temperature is directly above the heating elements, the sensor does not reflect a true reading of the temperature of the glass at the cooking areas.

When open coil heaters are used at a spaced distance below the plate there is also a poor thermal coupling between the heater and the glass-ceramic plate. In order to transfer the heat from an open coil heater to the glass-ceramic plate, the heater has to operate at high temperature which creates several problems such as poor efficiency of the system, high heat losses, overheating of components, and high cooktop temperatures. Glass-ceramic cooktops and surface units with open coil heaters also present a safety hazard in the event the glass-ceramic plate is broken.

In an attempt to overcome some of the aforenoted disadvantages of open coil heater assemblies, resort has been made to the use of various forms of heating arrangements. For example, in U.S. Pat. Nos. 3,612,827 and 3,632,983 to Dills, which are assigned to the assignee of the present invention, there is shown a glass-ceramic cooktop including a shallow mounting or rough-in box that contains a filler plate that has recesses for accommodating the heating units and wiring raceways for containing the electrical lead wires. The heating units are constructed with at least one flat side positioned directly against the underside of the cooking area of the flat cooktop surface.

To further improve the efficiency of the heating system, resort has been made to use of film heaters. Typical examples of glass-ceramic cooktops using film heaters are shown in the Hurko U.S. Pat. Nos. 3,067,315 and 3,883,719, both assigned to the assignee of the present invention. Such film heaters are of serpentine shape, and they are bonded directly to the plate. They provide a most efficiency heating system for glass-ceramic surface heating units or cooktops because the film strips have a very low thermal mass and good thermal coupling with the plate, resulting in quicker response to heat-up and cool-down conditions. The film heater stores very little heat, and it radiates very little heat in a downward direction because of its low emissivity surface. One disadvantage of film heater designs for solid plate surface heating units is the relatively high cost of film materials because they are of noble metals, such as gold and platinum and as a consequence thereof, resort may be made to etched foil heaters as shown in U.S. Pat. No. 4,032,750 to Hurko, also assigned to the assignee of the present invention.

It is extremely difficult to maintain an even temperature distribution across a glass-ceramic plate when heated directly by an open coil resistance heating element or a metal sheathed resistance heating element of looped configuration. Heat diffuses very slowly laterally through the glass-ceramic material, and hence, hot spots may be created on the plate surface nearest the areas of contact between the heater and the glass, as well as between the glass and the bottom of a cooking utensil, particularly if the cooking utensil has a warped or uneven surface. This type of glass cannot exceed an operational temperature of about 1300° F. at any point, hence, the total heat output of a glass ceramic surface heating unit would be reduced if the plate is provided with an uneven temperature distribution. In the absence of a temperature-limiting means, the plate would have to be underheated in order to avoid damaging the glass-ceramic plate.

To provide for a more even temperature distribution across the glass-ceramic plate, resort may be made to the use of a glass-ceramic plate surface heating unit having a high thermal conductivity layer such as aluminum or copper cast in a recess formed on the underside of the plate. A metal sheathed electrical resistance heating element with an underlying reinforcing member is cast into the high conductivity layer, so that the layer serves both as a mechanical and thermal coupling means between the heating element and the plate as well as a heat spreader means across the plate. The underside of the plate includes a plurality of cavities so as to increase the area of contact between the high conductivity layer and the glass-ceramic plate. Such an arrangement is shown in U.S. Pat. No. 3,885,128 to Dills, assigned to the assignee of the present invention.

Regardless of the type of heating unit employed, it is important to limit the operating temperature of the glass-ceramic plate to a temperature below about 1300° F. This can be done by introducing a temperature-limiting means in the solid plate surface heating element unit such that the power to the heating element is cut off if the temperature of the surface rises to a predetermined temperature.

In the aforementioned Dills U.S. Pat. No. 3,885,128, the temperature limiting means comprises a temperature sensor in the form of an elongated bulb which is positioned outside the outermost coil of the heating element and is positioned on the reinforcing framework and cast in the heat spreader layer. This sensor is a bulb-like member that is filled with a high temperature thermostatic fluid such as sodium potasium (NaK) or the like. The sensor communicates with a temperature responder by means of a capillary tube. This temperature responder is a single-point, temperature-limiting switch or thermostat that is set at a critical temperature of about 1250° F. This temperature responder includes switch means in a series circuit with the heating element such that if the critical temperature of the heat spreader casting would be reached the power circuit to the heating element would be broken and the heating element de-energized. A similar arrangement is utilized in the Hurko U.S. Pat. Nos. 3,622,754 and 3,883,719. Such sensors suffer from the disadvantage of delayed response and, because of positioning, being unable to respond instantaneously to changes in temperature of the heated area of the glass-ceramic plate surface of the cooktop.

It should also be noted that cooking utensils absorb heat from the cooking surface of the glass and this absorption depends to a great extent on the fit, i.e. the amount of contact betwen the cooking surface and the bottom of the cooking utensil or pan. Good fitting pans readily absorb heat so that the heating unit may operate a high percentage of time at a given temperature limit. Poor fitting pans, on the other hand, because of poor absorption rates, require that the system reduce its total heat input to even less than the no load value, and this response must be almost instantaneous.

Accordingly, it is important for a temperature sensor to measure the glass temperature at the interface between the underside of the glass-ceramic plate and the heater assembly, i.e. the region of maximum glass temperature.

The principal object of the present invention is to provide a temperature sensor for a solid, glass-ceramic plate surface heating unit which has rapid response, is simple to manufacture, low in cost, and which provides a high performance system.

Another object of the present invention is to provide an improved glass-ceramic plate cooktop having a temperature sensor disposed to monitor the cooktop at the region of maximum temperature.

A further object of the invention is to provide a temperature sensor particularly suitable for use as a temperature limit sensor for a glass-ceramic cooktop.

A still further object of the invention is to provide a temperature sensor for a glass-ceramic cooktop which may be used in combination with a variety of particular heating elements.

It is another object of the invention to provide a glass-ceramic cooktop temperature sensor which includes fail-safe protection against an open circuit in the sensor circuit.

SUMMARY OF THE INVENTION

The present invention, in accordance with one form thereof, relates to a temperature sensor for a solid, glass-ceramic plate surface heating unit or cooktop. The sensor element is integral with the glass-ceramic plate and comprises a pair of parallel film electrodes metallized onto the underside of the glass-ceramic material, i.e., the region of maximum glass temperature directly above the heater assembly. The resistance of the glass-ceramic between the electrodes is a function of temperature and changes in resistance are utilized to monitor temperature of the glass-ceramic and can be used to control the application of heater unit power.

In accordance with another form of the present invention a discrete shunt resistor element is positioned at the distal end of the parallel electrodes which are deposited along a predetermined length of the underside of the cooktop plate. This termination resistor provides a continuity check for the sensor which is connected in a control circuit so to allow power to be applied under proper operating conditions.

To this end, a control circuit is provided having a pair of voltage comparators and the peripheral conductor forms a common ground connection. The temperature sensor and continuity resistor are connected in parallel and form one leg of a voltage divider to which an alternating current (AC) excitation voltage is applied. The output of the voltage divider is applied to both comparators, the output of which is connected in common. One voltage comparator is set to develop an output if the resistance of the temperature sensor is above a minimum value as determined by the continuity resistor. The other voltage comparator is set to develop an output if the resistance of the temperature sensor falls below a predetermined value corresponding to the set temperature limit. The output from the comparators may be used to control the application of heater power so that the circuit functions as a temperature limit switch for the cooktops.

In accordance with another form of the invention, a further metallized strip conductor is connected to one conductor of each pair of sensor conductors and disposed about the periphery of the glass-ceramic plate to serve as a broken glass detector.

BRIEF DESCRIPTION OF THE DRAWINGS

This invention will be better understood from the following description taken in conjunction with the accompanying drawings wherein like parts are identified with like reference characters throughout the several views.

DESCRIPTION OF THE PREFERRED EMBODIMENTS

Figure 2:
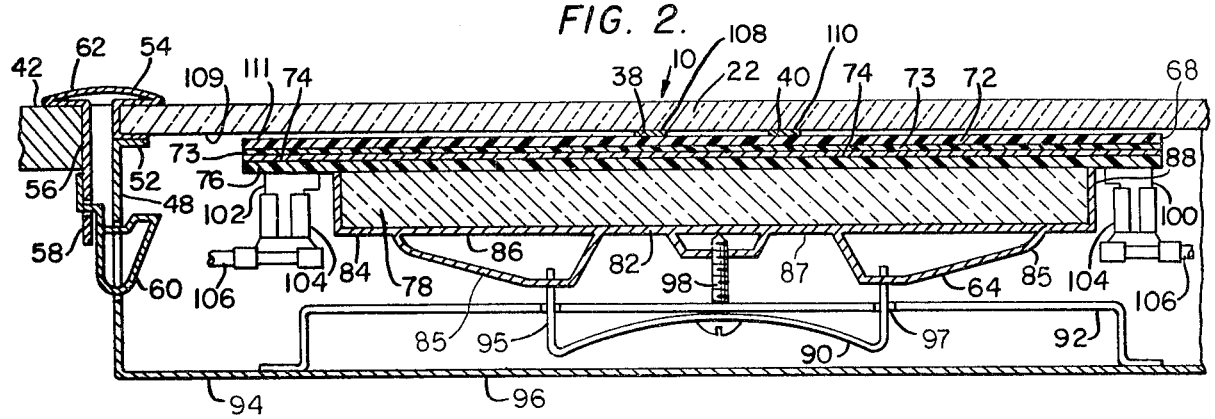
FIG. 2 is a fragmentary cross-section elevational view through a glass ceramic cooktop employing a separate insulated foil heater and also showing the temperature sensor of the present invention.
Figure 1:
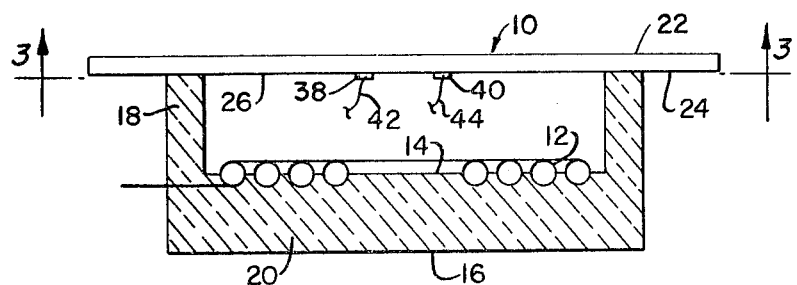
FIG. 1 is a diagrammatic, cross-sectional view of an open coil heating unit incorporating a temperature sensor in accordance with the present invention.

Turning now to a consideration of the drawings, and in particular to FIGS. 1 and 2, there are shown in cross-sectional elevational views two alternate forms of solid plate heating units 10 having a thin glass-ceramic plate in the order of 0.2 inch (5.08 cm) thick. FIG. 1 illustrates a glass-ceramic cooktop of the open coil type having spaced coils or heating wires 12 attached or secured to the interior bottom surface 14 of a relatively shallow box-like member or container 16 of a thermal or relatively high temperature resistant and electrically insulating material, such as, for example, an alumino-silicate material. Member or container 16 has a square planar configuration including a perimetric wall comprising sides 18 and a base 20. However, it will be readily apparent to those skilled in the art that container or member 16 need not necessarily have a square planar configuration but, if considered desirable or expedient, the container or member 16 may have a planar shape of a rectangle other than a square, or, further, a planar shape of any regular polygon, a circle, an ellipse, or a shape comprising a combination of curvilinear and the straight lines.

Box-like member or container 16 may further include one or more dividers (not shown), which extend diametrially across the container or member and divide the container and the interior or hollow thereof into substantially symmetric sections. Preferably, the side or edge surface of the dividers should abut the corresponding surface or surfaces of the aforesaid perimetric wall formed by the sides 18 of member or container 16, while the top surface of the divider supports the glass-ceramic cooktop plate 22. The divider may be an integral part of member or container 16 or, alternatively, may be a separately formed part which is secured in any suitable manner to the interior of the perimetric wall of container 16 in the position described.

A heating element 12 is shown attached or secured to the interior bottom surface of container 16, that is, to the upper surface 14 of the bottom portion of container 16.

Heating element 12 may be of any suitable form known in the art and a plurality of heating elements may be provided. Four heating elements or "burners" are more or less standard for a cooktop. For the purpose of illustrating this invention, only one heating means 12 is shown, as in FIG. 1. The heating means 12 is represented by an electrical resistance element of spiral configuration which is staked or otherwise supported and mounted to base 20. As is well understood by those skilled in this art, such a heating element 12 may be either a sheathed type, or an open coil type.

Of course, other forms of heating means may be utilized and element 12 is shown for illustrative purposes only.

Figure 3:
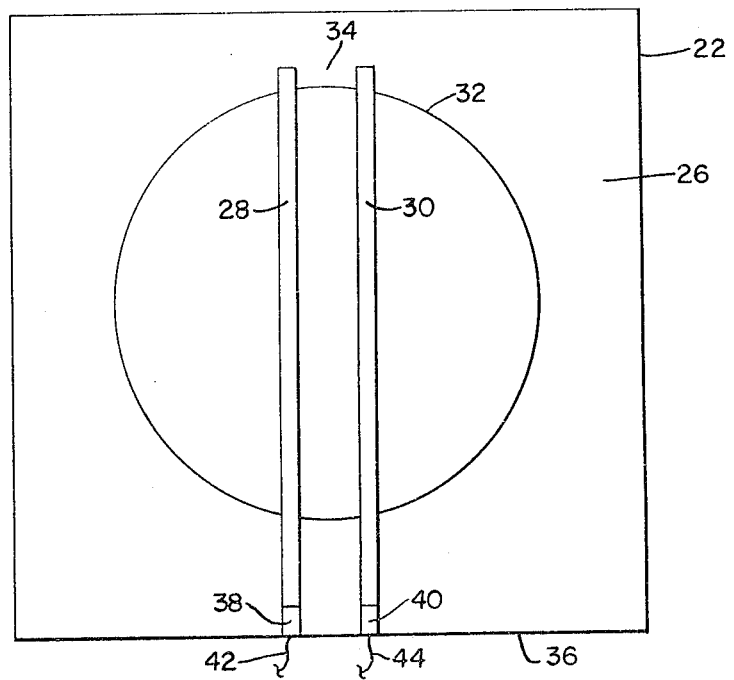
FIG. 3 is a view from the underside of the cooktop surface taken along lines 3—3 of FIG. 1.

Referring to FIGS. 1 and 3, the heating unit 10 includes a solid plate cooktop surface 22 which is supported on side walls 18 and may either be built into a kitchen countertop or assembled over the oven of an electric range for use in the home. The cooktop surface 22 closes off the open top of the rough in box 16 and forms a thin, utensil-supporting, glass-ceramic plate, which may be a large single plate or a series of either two medium plates or four smaller plates. Such glass-ceramic plate material is crystalline glass, generally opaque, or milk-white appearance, of lithia-alumina-silicates having a very low coefficient of thermal expansion. Examples of such material are sold under trademarks as PYROCERAM, CER-VIT and HERCUVIT. This glass-ceramic plate 22 has a smooth top surface of almost polished glass appearance and it is readily cleanable, and the plate does not permit the drainage of spillovers therebeneath, as in standard cooktops using coils of metal-sheathed heating elements.

This glass-ceramic material is electrically insulating (at low temperatures) and thermally transmissive as well as being highly wear and thermal shock resistant, and resistant to the physical and chemical attacks of foods and liquids which may come in contact with the plate at relatively high temperatures. While the term glass-ceramic material or crystalline glass material is used throughout it, it should be understood that this invention encompasses other materials with similar characteristics, such as quartz, high-silica glass, high-temperature glasses and different ceramic materials.

A peripheral ledge 24 around the top edge of the box 16 serves as a support means for the glass plate, and there may be others near the center of the plate, as needed. A T-shaped trim frame (not shown) may be provided to encircle the peripheral edge of the plate. The vertical portion of such frame would be fastened to the vertical walls 18 of the box 16 and top portion of the frame would have its uppermost half overlying the peripheral edge of the glass plate 22 and its outermost half adapted to overlie a peripheral edge of an opening (not shown) in a kitchen countertop when the cooktop is to be built into the kitchen counter. If this cooktop were to be assembled with an electric oven to form a complete range, then the mounting means for the glass plate would be altered accordingly, as would be clear to those skilled in the art.

It is important to limit the operating temperature of the glass-ceramic plate 22 to a temperature below about 1300° F. This can best be done by introducing a temperature-limiting means to the solid plate surface unit of the present invention such that the power to the heating element 12 is cut off if the temperature rises to a predetermined temperature. In the prior art, as shown, for example, in the aforementioned Hurko U.S. Pat. No. 3,622,754, and Dills U.S. Pat. No. 3,885,128, a temperature limiting means for the heating unit is provided. This temperature-limiting means comprises a temperature sensor in the form of an elongated bulb which is positioned outside the outermost coil of the heating element and is positioned on the reinforcing framework and cast in the heat spreader layer provided to increase heat transfer from the heating coils. This sensor is a bulb-like member that is filled with a high temperature thermostatic fluid such as sodium potasium (NaK) or the like. The sensor communicates with a temperature responder by means of a capillary tube. This temperature responder is a single-point, temperature- limiting switch or thermostat that is set at a critical temperature of about 1250° F. This temperature limiting means includes switch means in a series circuit with the heating element such that if the critical temperature of the heat spreader casting would be reached the power circuit to the heating element would be broken and the heating element de-energized.

It is extremely difficult to maintain an even temperature distribution across this glass-ceramic plate 22 when heated directly by an open coil resistance heating element or a metal sheathed resistance heating element of looped configuration. Hot spots are created on the plate surface nearest the areas of contact between the heater and the glass. This type of glass cannot safely exceed an operational temperature of about 1300° F. at any point. In the absence of a temperature-limiting means, the plate would have to be underheated in order to avoid damaging the glass-ceramic plate.

Such hot spots are also created between the glass-ceramic cooktop surface and the bottom of a warped cooking utensil. Good fitting (flat bottom) utensils have good heat transfer characteristics and readily absorb heat from the surface so that the heating unit is energized a high percentage of the time. However, poor fitting utensils have poor heat transfer causing rapid heat buildup and reduction of heat input to even less than no load value and this response is almost instantaneous. Inasmuch as heat diffuses very slowly through the glass-ceramic material, a temperature sensor disposed at the edge of a cooktop or one which does not have a rapid response would necessarily require the temperature limiting means to be set for operation at a lower temperature to compensate for the slow response and avoid damaging the glass-ceramic plate. As a result, the glass-ceramic plate would be underheated.

The present invention advantageously incorporates a temperature sensor which is integral with the glass-ceramic cooktop surface and responds to changes in the electrical resistance of the glass-ceramic material when heated. To this end, referring to FIG. 3, the underside 26 of the glass-ceramic cooktop plate 22 has bonded thereto, in the region of maximum temperature, a pair of spaced, parallel metallized conductor strips 28 and 30, the distal end 34 of which extends beyond the heated maximum temperature region of the glass-ceramic plate which is indicated by the circle 32. In accordance with one embodiment of the invention, strips 28 and 30 may be open-ended at the termination point 34 in the cool region of the glass- ceramic plate, i.e. beyond the boundary of circle 32. The other ends of the strips 28 and 30 are terminated at the edge 36 of the glass-ceramic plate. Because the terminations are relatively cool, suitable connections 38 and 40 may be made to leads 42 and 44 leading to an external control circuit by soldering, or by spring loaded contacts or other suitable contact arrangement.

Conductors 28 and 30 may be a precious metal such as gold, paladium, gold-paladium combinations or the like, which may be silk screened and fired unto the surface at a temperature of about 1300° F. The two strip conductors are built up to a thickness of about 50 to 100 angstroms and extend from the edge of plate 22 through the region of maximum heat and terminate in a cool region 34. The strips are spaced apart a distance of about 0.4 in (10.16 cm). The width of each strip is approximately 0.2 in (5.08 cm). Such a construction gives a finite measurable resistance value for each strip conductor 28, 30; however, the resistance of the strips is not critical and any value between about 0.1 ohm and 100 ohms can advantageously be used. The useful resistance as seen by the temperature sensor is that which can be measured between the strip conductors 28 and 30.

The resistance between the strips is a function of the distance between strips, length, glass thickness, cooktop material, and temperature. In use, in a given configuration, the resistance is a function of the sum of incremental resistances between the strips. The incremental resistances are functions of temperature and temperature gradients in the glass. Because of the non-linearity of the temperature resistance characteristics and the temperature gradients, the resistance is very difficult to determine analytically, but roughly follows the following equation:

$$R = K \cdot R_o \cdot \epsilon B(\frac{1}{T} - \frac{1}{T_o})$$

wherein
 R = Resistance at some temperature (T) Kelvin
 $R_o$ = Resistance at some temperature ($T_o$) Kelvin
 B = is a characteristic of the material and is approximately 12200 for Pryoceram
 K = a constant depending on the configuration.

Figure 4:
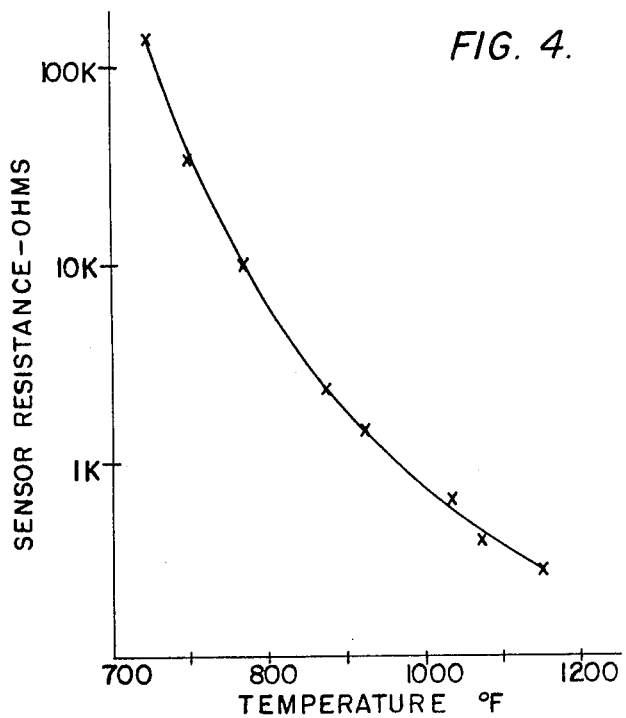
FIG. 4 is a plot of the change in resistance of the temperature sensor of the present invention with changes in the temperature of the cooktop.

FIG. 4 represents a plot of the resistance of a sensor embodying the invention as shown in FIGS. 1 and 3. Two parallel strips of gold spaced 0.4 in. (10–16 cm), 0.2 in. (5.08 cm) wide and 7 in (17.75 cm) long were fired on the underside of a pyroceram cooktop. The sensor assembly was then placed in an oven and the resistance measured at various temperature levels. All measurements were taken after the temperature in the oven had stabilized. It can be seen from FIG. 4, that by monitoring the drop in sensor resistance, a convenient circuit arrangement can be provided to control heater unit power in response to temperature of the cooktop which is reflected by the measured value of resistance.

The efficacy and quickness of response of the sensor is demonstrated by % ON time of a heater unit with varying load conditions inasmuch as the sensor in effect responds to the ability of a utensil to absorb heat from the cooktop surface. A flat pan makes good contact with the cooktop surface and thus should provide good heat transfer characteristics. Poor pans cause the system to reduce the heat input to even less than no load value. Sensor response is almost instantaneous and prevents rapid and dangerous heat build-up in the cooktop surface which would result in the absence of temperature control.

An unobvious result occurs when the liquid contents of a utensil or pan boils dry. A utensil which, when filled with liquid, such as, for example, water and brought to a boil, may be loading at a 95% rate. However, when the utensil boils dry, the load may run at only a 40% rate and the change is very rapid. The rapid control system response provided by the invention protects the glass against this condition.

The following chart and illustrative example demonstrate the advantage of the sensor of the present invention. A cooktop as shown in FIGS. 1 and 3 was connected in an electronic circuit to control heater unit power in response to sensor resistance. With a preselected calibration or setting of the temperature control circuit and under various loading conditions, the following results were achieved:

| Load | Utensil Bottom Shape | % ON |
|---|---|---|
| No load | | 39.3 |
| Porcelain Enamel (with boiling water) | Flat | 93.2 |
| Mirro (with boiling water) | Al., Concave | 33.8 |
| Eureka (with boiling water) | Al., Slightly Convex | 60.5 |
| Magnilite (with boiling water) | Cast Al., Flat | 96.9 |
| Foil (only) | Al., Flat on Glass | 14.0 |

Obviously, the sensor responds to the ability of a utensil to absorb heat as the % ON time correlates to the good fitting utensils.

Referring now to FIG. 2, there is shown an embodiment of the invention wherein a temperature resistance sensor is used in combination with a flat plate heating surface of the type described in the aforementioned U.S. Pat. No. 4,032,750. It will thus be apparent that the present invention may be employed in combination with any suitable means for heating the glass-ceramic plate 22.

The cooktop 10 has a shallow mounting box or rough-in box 44 having a bottom wall 46, vertical side walls 48, and an open top which is adapted to be closed by a thin, utensil-supporting, glass-ceramic plate 22, which may be a large single plate for accommodating four heating units, or a series of either two medium plates or four smaller individual plates. Such glass-ceramic plate material may be of the type previously described as being sold under the trademarks PYRCERAM, CER-VIT or HERCUVIT.

A peripheral ledge of flange 52 around the top edge of the vertical walls 48 of the rough-in box 44 serves as a support means for the glass plate 22, and there may be other support ledges near the center of the box, as needed. The peripheral edge of the glass plate 22 is provided with a resilient gasket 54 for protecting the edge and serving as a resilient seat and moisture barrier. A trim frame 56, of T-shaped transverse cross-section, encircles the periphery of the box 44 and serves as a support means for the box in an opening of countertop 42, as is conventional in this art. The vertical portion 58 of the trim frame 56 is adapted to be fastened to the vertical walls 48 of the rough-in box by means of a series of widely-spaced spring clips 60. The top crown 62 of the T-shaped trim frame 56 has its innermost half overlying the peripheral edge of the glass plate 22, and its outermost half adapted to overlie a peripheral edge of a kitchen countertop 42 that forms an opening for receiving the cooktop 10 therein. Suitable hold-down clamps (not shown) would be used to anchor the cooktop in place. If this cooktop 10 were to be assembled with an electric oven to form a complete range, then the mounting means for the glass plate would be altered accordingly, as would be clear to those skilled in this art.

The cooktop 10 may have a plurality of surface heating units associated therewith, four being more or less standard in the electric range art. For the purpose of illustrating the present invention, only one surface heating unit 64 is shown, as in FIG. 2. The surface unit 64 has a heating means 68 in the form of a thin, flexible, dielectric sheet 72 and an etched resistive foil heater 74 of coiled configuration adhesively bonded by an inorganic binder 73 to the underside of the dielectric sheet 72. A second dielectric sheet 76 may be bonded to the underside of the foil heater to sandwich the foil heater between dielectric sheets 72 and 76. The heating means is supported contiguous with the plate 22 (shown spaced apart in FIG. 2 for clarity).

Suitable inorganic binders have proved to be either sodium, potassium, or aluminum silicates, which are capable of withstanding temperatures having a maximum limit in the vicinity of 1250° F., although, at these temperatures, the binder forms a rather weak bond between the dielectric sheets 72 and 76 and the foil heater 74. This rather weak bond is a positive characteristic of the heating means 68 in that it allows for free expansion of these several components, such that the coil heater coils stay evenly spaced and the laminated heater assembly 68 does not warp or move away from the glass-ceramic plate 22 at the high operating temperatures.

The foil heater 74 is a thin foil on the order of 0.002 inches, etched from stainless steel or Nichrome foil in a coiled configuration, similar to those used with film heaters. The foil heater coil is bound to the dielectric sheets 72 and 76 for protection purposes and ease in handling. These dielectric sheets may be ceramic paper, or fiber glass cloth, or Micamet sheets of insulation that are about 0.010 inches thick, such that the entire assembly of foil heater 74 and the upper and lower dielectric sheets 72 and 76 result in a sandwich that is wafer thin, as well as being flexible, in order to conform to the undersurface of the glass-ceramic plate 20.

The heating means 68 is supported on a pad 78 of dielectric material of high insulating quality, such as Microtherm. This insulating pad 78 is seated in a reinforced reflector pan 87. The pan supports the insulating pad 78 and exerts a constant upward pressure against the heating means 68 to hold the heating means tightly against the underside of the cover plate 22.

The pan 87 is reinforced or embossed such that it will have a rigid construction. The pan 87 is generally circular in shape and it has a flat central area 82, a narrow peripheral area 84 in the same horizontal plane as the central area and a series of radial arms 86 connecting the central area with the peripheral area and positioned in the same horizontal plan therewith. In between the radial arms are depressions or embossments 85 which serve to strengthen the pan and make it more rigid. The periphery of the pan is provided with a vertical wall 88 to enclose the insulating pad, the latter forming a heat barrier against heat flow in a downward direction from the heating means 68.

A constant upward pressure is exerted against the heating means 68 through the insulating pad 78 and the reflector pan 87. This upward pressure forces the heating means 68 into full contact with the plate 22 and thereby insures good thermal coupling between the heating means 68 and the cover plate 22 and inhibits localized overheating of the heating means. A force of somewhere between 5 pounds and 25 pounds of pressure on a 6-inch diameter surface heating unit allows good thermal coupling between the heating means and the cover plate, with free expansion of the foil heater if necessary. The upward pressure is provided by a leaf spring 90 which is fastened to a brace 92 that is attached to the bottom wall 96 of the rough-in box 94. The spring 90 is of thin spring stock and it has two upturned ends 95 which extend through enlarged openings 96 in the brace and are fastened into openings (not shown) in the bottom wall of the reflector pan 87. A fastening screw 98 extends through the center of the spring 90 and is threaded into an opening in the brace. The screw extends into an oversized opening in the reflector pan 87. So as not to allow the screw to injure the insulating pad 78, the center of the reflector pan is depressed slightly. Thus, when the fastening screw 98 is tightened, the spring 90 bows upwardly against the reflector pan 87. Two terminals 100 and 102, shown at opposite sides of the surface unit, connect to the foil heater 74. The configuration of the foil heater 74 is not shown in detail but it is generally of coiled configuration, starting at the periphery of the heating means 64 until it reaches the center where it doubles back on itself and has a reverse spiral going in the opposite direction generally parallel with the first spiral but terminating at the diametrically opposite side of the heating means. This specific coiled configuration is generally well known and does not form part of the present invention. It is well to recognize that the thickness of the foil heater 74 is increased at the terminals in order to reduce the operating temperature at the terminals. Push-on connectors 104 may be fitted onto the terminals for making an electrical connection therewith. Lead wires 106 are crimped to the connectors 104, as is standard in this art.

It should be recognized that the aforesaid heating unit is of the type shown and described in the aforenoted Hurko U.S. Pat. No. 4,032,750, to which reference may be made for a more detailed description thereof. In accordance with the present invention, the heating unit is provided with a temperature/resistance sensor disposed on the underside 109 of the glass-ceramic plate.

Referring again to FIG. 2, the sensor takes the form of a pair of strip conductors 108 and 110 of the type described in connection with FIGS. 1 and 3. Conductors 108 and 110 are shown greatly enlarged in the drawing; however, it should be readily apparent that the conductors 108 and 110 are built up only to a thickness of about 50 to 100 angstroms and, thus, do not form any discernible extension beyond the plane of the underside 109 which abuts against the upper surface 111 of dielectric layer 72. The space therebetween as shown in the drawing is only for clarity in illustration. The ends of conductors 108 and 110 are built up to a slightly greater thickness to accommodate suitable terminal connectors, which may be similar to the terminals 100 and 102. Lead wires from the terminal connections are in turn connected to a control circuit adapted to control application of power to the heating unit 68 in response to a predetermined change in the resistance of the glass-ceramic plate 22. The strips 108 and 110 are disposed to monitor resistance of the cooktop at the region of maximum temperature as illustrated, for example, in FIG. 3.

With reference to the aforenoted resistance temperature sensor shown in FIGS. 1 and 3, conductors 28 and 30 terminate in an open condition in a cool region of the cooktop plate 22. As such, it is difficult to distinguish between a broken or open conductor condition and a cold cookplate. "Looking" into the conductors, the resistance measurement would be very high under both conditions. Accordingly, to monitor the condition of the conductors a continuity check is provided. To this end, each pair of strip conductors is terminated with a continuity resistor of approximately 50K ohms. Advantageously, as will be hereinafter described, the ratio of the resistance of the terminating or shunt resistor to the resistance of the glass-ceramic between the strip conductors at the operating temperature of the heated glass-ceramic plate is such that the shunt resistor has negligible effect on the operation of the sensing means. Thus, the ratio should be greater than 10/1.

An additional safety feature may be incorporated by including a peripheral strip ground conductor which serves as a broken glass detector. The peripheral ground conductor may be metallized to the underside of the cooktop at the same time as the sensor conductors or in a separate deposition step. Such strip may be of the same metal as that of the sensors, but preferably is a lower-cost metal such as silver, capable of being deposited on the undersurface in a thin layer.

Figure 5:
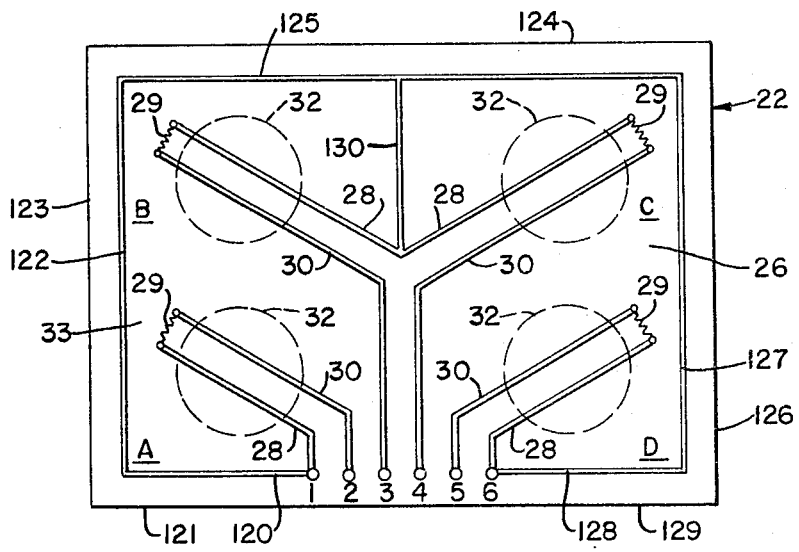
FIG. 5 is a diagrammatic view of the underside of a four "burner" glass-ceramic cooktop surface employing a separate sensor for each of the four heated areas of the glass-ceramic plate and a peripheral conductive strip which serves as a broken glass detector.

Referring to FIG. 5, there is shown the underside 26 of a ceramic glass cooktop 22 having four cooking areas, A, B, C and D. Each cooking area has a region of maximum heat outlined in circular form by dash lines 32. Each cooking area has associated therewith a resistance sensitive temperature sensor of the type heretofore described comprising a pair of strip conductors 28 and 30 which extend from an area adjacent the edge 36 of the cooktop plate 22 through an associated cooking area 32, terminating in a cool region 33. Preferably, each strip is terminated with resistance element 29 having a value in the order of 50K ohms.

As shown in FIG. 5, six (6) external terminal points 1-6 diagrammatically illustrate terminal ends of the sensors. Terminals 1 and 6 serve as the common ground terminals and are connected to one of the strip conductors of each pair by a metallized strip which surrounds the periphery of the glass. A circuit can be easily traced starting at terminal 1 where strip 120 is connected to sensor strip 28A. For convenience, the alphabetic cooking region designation may be suffixed to the reference character of elements found in each region. Strip 120 extends adjacent lower edge 121 of plate 22 as seen in the drawing, and has a sharp right angle bend at the corner of plate 22, thereafter extending upward as at 122 adjacent edge 123. At the upper left corner of cooktop 22, as seen in the drawing, i.e., in region B, strip 122 is provided with an inward right angle bend and extends across plate 22 adjacent edge 124 as at 125 to region C. The strip follows the peripheral edge 126 of plate 122 as at 127 and as an inward right angle bend, continuing at 128 adjacent edge 129 to terminal 6. To complete the common ground connection to sensor strips 28B, 28C, a conductor strip 130 is provided between strip 125 and the common junction point of strips 28B and 28C. Each strip 30A, 30B, 30C and 30D are individually connected to external terminal points 2, 3, 4 and 5, respectively.

As shown in FIG. 5, the external connections are made in the relative cool area away from the heated region toward the central bottom edge of the glass and the sensor strips angle outward toward their respective heated regions from the central area. It should, however, be apparent that any other suitable geometric arrangement for the sensors may be employed, so long as they cross the region of maximum temperature defined by circle 32.

Figure 6:
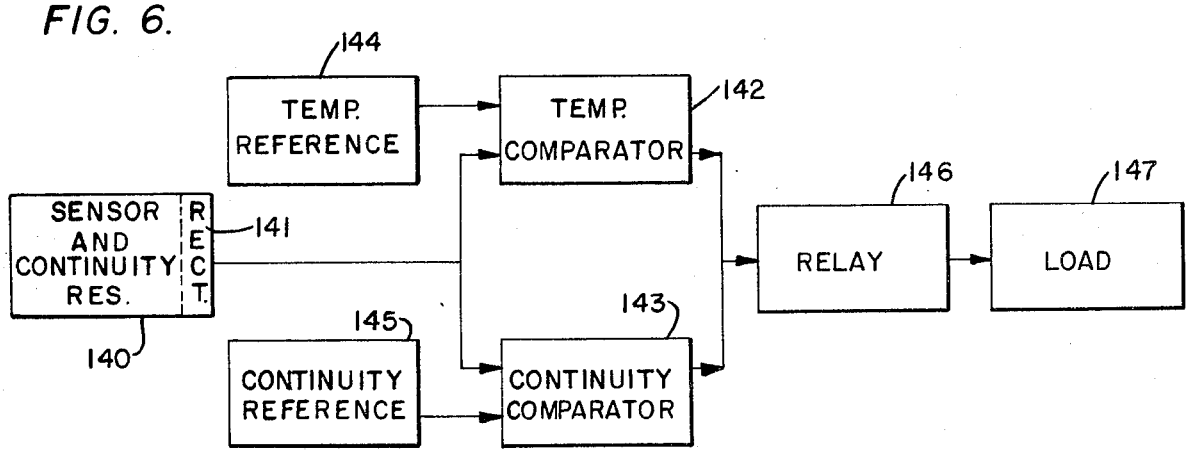
FIG. 6 is a block diagram of a control circuit in accordance with the present invention used to control application of power to the heater coils.

A block diagram of a control circuit suitable for use with the glass-ceramic cooktop of FIGS. 1–3, as illustrated in FIG. 6. A separate control circuit is provided for each heated region or "burner" of the cooktop, but for convenience, only one control is described and illustrated. As shown in FIG. 6, an output voltage developed across the sensor and continuity sensing means 140 is applied after rectification at 141 to the input of an associated temperature comparator means 142 and continuity comparator means 143. The second input of the temperature comparator means 142 is derived from a temperature reference means 144 and the second input of the continuity comparator means 143 is derived from continuity reference means 145. The outputs of the comparator means 142, 143 are connected in common and applied to relay control means 146 which controls application of power to the heating elements of the cooktop or load 147.

Continuity comparator means 143 may take the form of an operational amplifier voltage comparator which performs a fail-safe function and prevents the relay control means 146 from causing the load 147 to be energized if the continuity resistance means indicates a break or discontinuity in the sensor, i.e. control means 146 is allowed to be activated (thus opening is normally closed relay) only if the sensor resistance is below a minimum value.

Figure 7:
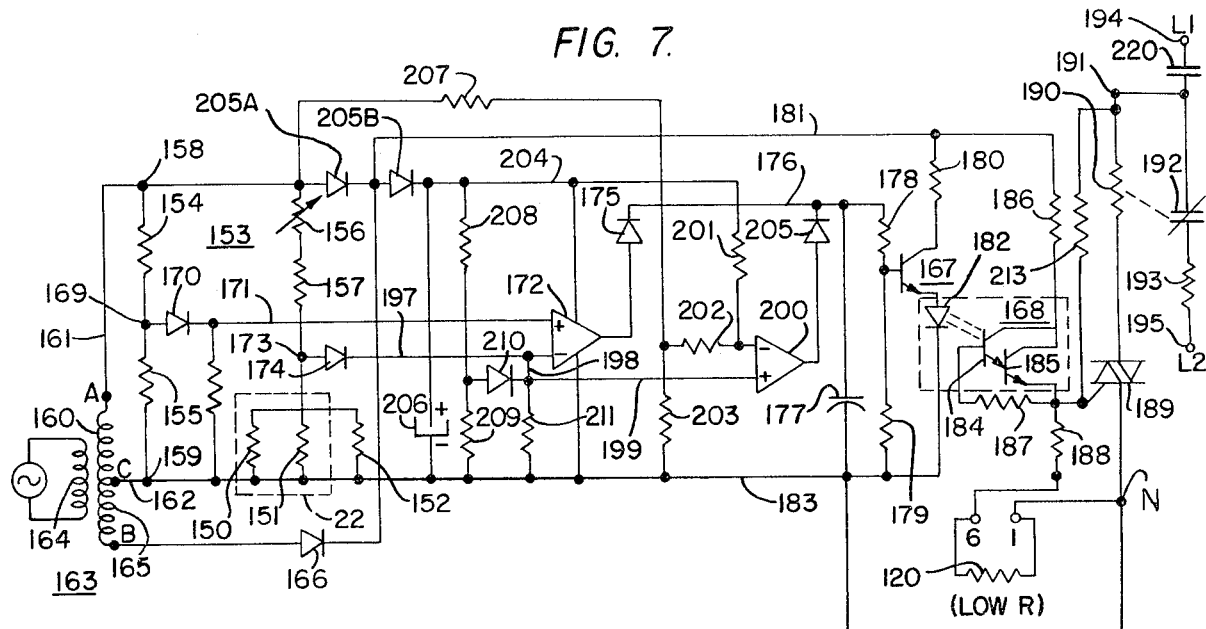
FIG. 7 is a schematic diagram of the control circuit of FIG. 6.

A detailed schematic diagram of a specific circuit for effecting control of the load heaters is shown in FIG. 7. The specific circuitry of FIG. 7 is not the subject matter of the present invention, but rather is the subject matter of the copending Serrano application Ser. No. 912,152. It will be apparent that many different circuits could be designed for use with the sensors of the present invention.

A sensor resistor 150 and continuity resistor 151 are shown connected in parallel with dash lines representing cooktop surface 2. Sensor resistor 150 corresponds to the resistance between strip conductors 28 and 30. Continuity resistor 151 of FIG. 7 corresponds to the FIG. 5 continuity resistor 29 terminating the strip conductors 28 and 30. Sensor resistor 150, together with continuity resistor 151, is connected in parallel with resistor 152 in AC bridge 153. Bridge 153 is made up by resistors 154, 155, control resistor 156, resistor 157 and the aforementioned resistors 150, 151 and 152. An AC voltage is applied across terminal junctions 158 and 159 of the bridge. To this end junctions 158 and 159 are connected across the A-C terminals of transformer secondary winding 160 via conductors 161 and 162, respectively. Transformer 163 is adapted to have its primary winding 164 connected to a 120 volt AC source whenever the heater coils of the cooktop are to be energized. Winding 165 between terminals B and C and winding 160 between terminals A and C of the transformer secondary, together with rectifiers 166 and 205A provide a full wave rectified voltage at a preselected positive level to DC control elements 167 and 168 of the relay control means. Rectifier 205B and capacitor 206 provide well filtered full wave rectified bias to comparators 172 and 200.

In operation, an AC temperature reference voltage is established at the junction 169 of the voltage divider formed by resistors 154 and 155. The junction 169 is connected to the anode terminal of rectifier 170 so that only positive pulses of the temperature reference signal are applied via conductor 171 to the positive input of operational amplifier 172 which corresponds to the temperature comparator means 142 of FIG. 6. An AC sensor control signal is developed at junction 173 of sensor resistor 150 and resistor 157. Junction 173 is connected to the anode terminal diode 174 such that only positive pulses of the sensor control signal are applied to the negative input terminal of operational amplifier 172 via conductor 197. These positive pulses are also applied to the positive input terminal of operational amplifier 200 via conductors 198 and 199.

In accordance with the present invention and as previously mentioned, the sensor and continuity resistor have AC applied thereto to avoid polarization effects which would otherwise adversely affect operation of the circuit. In operation, operational amplifier 172 is biased such that that its output is low with the amplifier set to sense a predetermined differential input across junctions 169 and 173 through junctions 169 and 173 through rectifiers 170 and 174. The output of amplifier 172 is applied via rectifier 175 and conductor 176 across capacitor 177. The positive DC pulses are integrated by capacitor 177, the resultant charge voltage being applied across a voltage divider comprising resistors 178 and 179.

The relay control circuit means may comprise an optical control arrangement of known type including, for example, transistor control element 167 which has its control gate electrode connecting to the junction of resistors 178 and 179. The collector of transistor 167 is connected via resistor 180 to positive bus 181 so as to receive a suitable power supply voltage. The emitter of transistor 167 is connected to the anode terminal of light emitting diode 182 which has its cathode terminal returned to the common neutral bus 183.

The light output of diode 182 is optically coupled to a light sensitive IC control element 168 arranged in a conventional configuration and including transistor elements 184 and 185, the collectors of which are connected in common to the positive bus 181 via resistor 186. The base of transistor 184 is connected to the emitter electrode of transistor 185 via resistor 187 and the emitter is returned to the neutral bus 183 via resistors 188 and 120. A control voltage developed across resistor 188 is coupled to the control or gate electrode of a conventional TRIAC or silicon control device 189 serially connected with coil 190 of a relay control. Coil 190, is disposed between the line input voltage terminal 191 and the neutral line terminal N. Relay coil 190 has operatively associated therewith a pair of normally closed contacts 192 serially connected to heater element 193. The serially connected elements 192 and 193 are connected between AC power supply terminals 194 and 195.

Continuity comparator means 143 is likewise set to sense a differential input across a pair of voltage dividers. However, inasmuch as the continuity resistor 151, like the temperature sensor resistor 150, has AC applied thereacross, the inverting or negative input of operational amplifier 200 must be synchronized to the AC power line. To this end, a positive bias is established at the inverting input of amplifier 200 by voltage divider comprising resistors 201, 202 and 203 serially connected between positive bus line 204 and neutral ine 183. Bus 204 has applied thereto the output voltage derived across output terminals A-C of the secondary winding 160 of the power transformer after the output voltage has been rectified by series diodes 205 and smoothing capacitor 206. An AC synchronizing input to the inverting input of amplifier 200 is derived from the junction of resistors 207 and 203 forming an AC voltage divider connected across the outputs secondary A-C terminals of the power transformer. The positive or non-inverting input of amplifier 200 is connected to the voltage divider including the sensor resistors 150 and 151 via diode 174 such that the voltage of the positive input of amplifier 200 is a function of the positive going pulses of the power waveform. Diode 174 effectively blocks the negative pulses. A small positive voltage in the order of 100 millivolts is derived from the resistive voltage divider comprising resistors 208 and 209 connected across the smoothing capacitor 206. The junction of resistors 208 and 209 is connected to the anode terminal of diode 210, the cathode terminal of which is connected to the positive input terminal of amplifier 200. The output terminal of diode 210 is also connected to the inverting input terminal of amplifier 172 and a resistive element 211 is connected between the cathode terminal and ground.

The following chart identifies the various components of FIG. 7 and where appropriate, lists a suggested value. Components identified with a "c" following the reference character are common to all heater units of a cooktop where two or more are employed and those not identified with a "c" are repeated for each heater control circuit.

| | |
|---|---|
| 150 | strip sensor-temperature dependent |
| 151 | 47K–50K ohms |
| 152 | 470K ohms |
| 154c | 820 ohms |
| 155c | 390 ohms |
| 156 | (Variable R) 10K ohms |
| 157 | 2.7 K ohms |
| 163c | Transformer 120v, 60 Hz |
| 166 | 1N5059 |
| 167 | 2N 5308 |
| 168 | Part of H11B2 package |
| 170c | (Diode) 1N4148 |
| 172 | LM 324 |
| 174 | (Diode) 1N4148 |
| 175 | (Diode) 1N4148 |
| 177 | .22 mf |
| 178 | 180 K ohms |
| 179 | 18 K ohms |
| 180 | 390 ohms |
| 182 | Part of H11B2 package |
| 186 | 470 ohms |
| 187 | 47 K ohms |
| 189 | SC 136B |
| 200 | LM 324 |
| 201c | 12K ohms |
| 202c | 1K ohms |
| 203c | 12K ohms |
| 205c | (Diodes) 1N4148 |
| 206c | 50 mf |
| 207c | 1K ohms |
| 208c | 100K ohms |
| 209c | 47K ohms |
| 210 | (Diodes) 1N4148 |
| 211 | Resistor 470 K ohm |

It should be noted from a comparison of FIG. 4 and the values given in the foregoing chart that sensor resistor 150, when cold, has a relatively high value of operating resistance and to the circuit looks like an open resistor. Thus, to distinguish between an open circuit, which could result in dangerous operating conditions and adversely affect the cooktop, and a cold condition, continuity resistor 151 is provided. Resistor 151 which has a value of approximately 50 K ohms effectively shunts the strip sensor resistance element 150 when the cooktop surface is cold. On the other hand, when the cooktop surface approaches its limiting temperature, its value reduces to the order of 1 K ohms or less, and effectively shunts the continuity control which nevertheless continues to provide its protective function as the cooktop surface temperature cycles about the limiting temperature and prevents operation thereof should the sensor open.

In operation, at startup, when the cooktop surface 22 is cold, and the coil heater 193 is warming up, both amplifiers 172 and 200 have a low voltage output. Thus, LED 182 is not emitting and TRIAC 189 is OFF. Relay coil 190 is de-energized and contacts 192 are closed as shown in FIG. 7 with power being applied across heating coil 193. The inverting input terminal of amplifier 172 is biased somewhat higher than the non-inverting input or positive input so that the amplifier is biased slightly negative. This is accomplished by virtue of the small DC bias derived from voltage divider 208, 209 and the positive pulses derived from the sensors through rectifier 174.

Amplifier 200 is also biased negative so that it will be OFF and open sensor comparison is effected near the peak of the voltage waveform through diode 174. The negative input terminal of amplifier 200 is set at approximately 12/13 of the AC voltage through the voltage divider comprising 1 K ohm resistor 207 and the 12 K ohm resistor 203. The positive input is a function of the sensor voltage divider comprising resistors 156, 157 and 151. Should the sensor wires open or be broken, the positive input of the amplifier will rise to maximum voltage to turn the amplifier on. So long as the sensor wires are not broken, the amplifier is in effect looking at AC across the sensors of the AC bridge and outputs on the peak of the positive pulses applied through diode 174. This result in a charge or voltage accumulation at capacitor 177 which rises to the firing voltage of transistor 167. The inverting input of amplifier 200 is synchronized to AC by virtue of its connection to the junction of AC voltage divider 207 and 203.

The connections to and operation of the peripheral strip 120 employed for broken glass detection will now be considered. The particular connections described hereinafter are exemplary only, as numerous circuits are possible. The broken glass detector strip 120 is connected to terminals 6 and 1 as shown in FIG. 7. The strip 120 exhibits a resistance of only a few ohms so that point 6 in FIG. 7 is essentially at common or ground potential via the lead 219. If the strip 120 is broken, point 6 is pulled toward the potential terminal 191 thereby triggering the triac 189. To ensure that the triac 189 is triggered under such conditions so as to energize the relay heater 190 and open the contact 192, a high value leakage resistance 213 is connected between the gate of the triac 189 and the terminal 191.

Assuming continuity sensor resistor 151 and broken glass detector indicates all is well, heater coil 193 is energized and resistor 150 begins to decrease in value as the cooktop surface warms up. The operating point of amplifier 172 is set at approximately one third of the supply input voltage by means of set resistor 156. Sensing during every half cycle of the supply continues until the voltage applied to the noninverting (+) input of the amplifier 172 exceeds the set point voltage at the inverting (−), whereupon the amplifier 172 starts to turn on on positive peaks of the applied voltage, charging the capacitor 177 to a voltage sufficient to turn on the transistor 167 indicating the temperature limit has been reached. Turning on of transistor 167 causes TRIAC 189 to be gated via the optical coupler. Advantageously, resistor 156 is set so that TRIAC 189 is energized when the temperature of the cooktop is approximately 1250° F.

Figure 8:
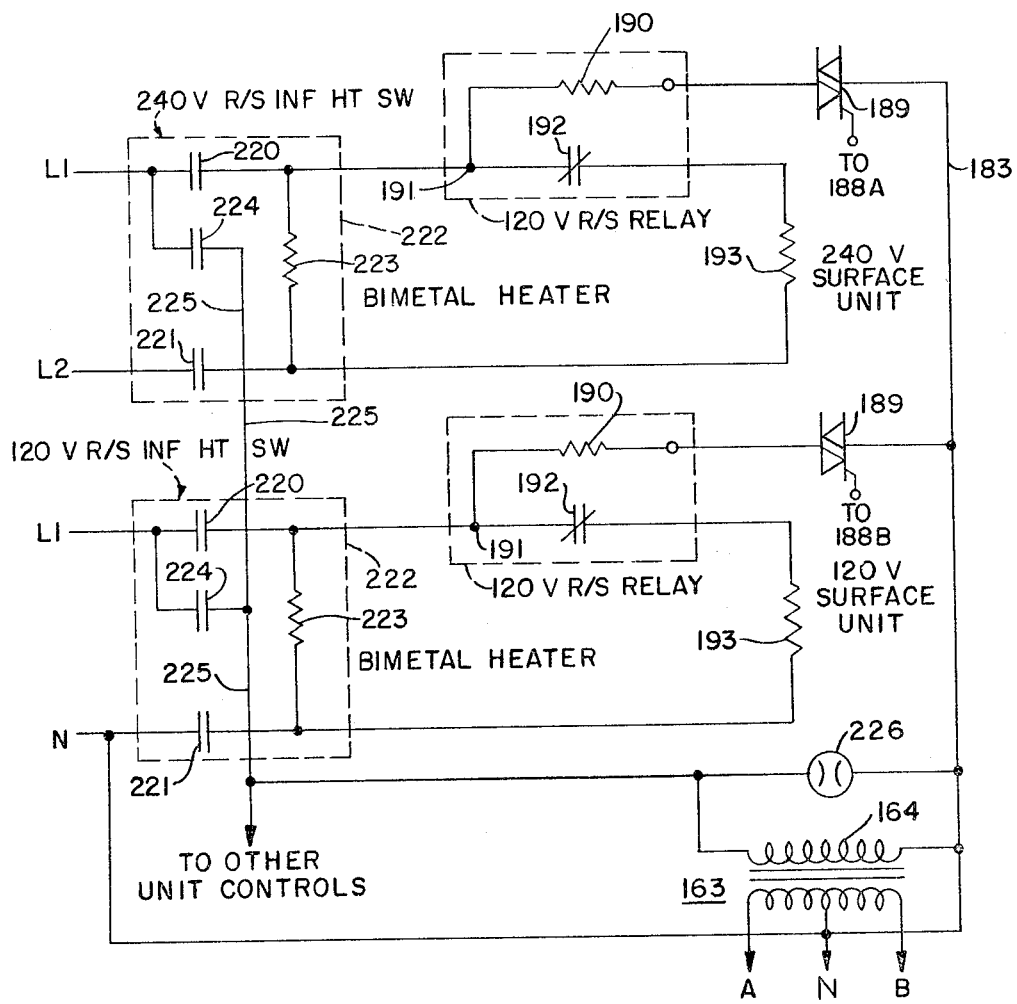
FIG. 8 illustrates a typical power wiring arrangement for two "burner" units of a four "burner" range, the wiring for the other two "burner" units being identical.

A simplified power wiring diagram is illustrated in FIG. 8. Power wiring for two units only are illustrated. The upper unit, as shown in the drawing, is a high heat 240 volt surface unit, while the lower unit is a low heat 120 volt surface unit. As should be apparent, the other units (not shown) could be duplicates of one or both of the surface units shown. For convenience, because of the identity of operation, like parts of the surfact units are described with like reference characters.

Power input to the surface heater unit is applied across the L1-L2 input terminals in the case of the 240 volt surface heating unit and the Li-N input terminals in the case of the 120 volt surface heating unit. The input terminals are connected to a pair of normally open contacts 220, 221 of a conventional manually operable infinite heat switch 222 outlined in dash lines. Each heat switch includes a thermal element comprising bimetal heater 223 operatively connected to the contacts 220 and set to open contacts 220 in a cyclic manner so as to achieve any desired average heating rate. Each switch 222 also includes a pair of unit accessory control contacts 224 connected on one side to the hot side of contacts 220, i.e. the line input terminal side L1, and on its other side through conductor 225 to various unit accessory elements such as pilot light 226. Also connected to the accessory power bus is the primary winding 164 of transformer 163, the secondary of which is connected to apply power to the sensor control circuit elements as hereinbefore described. A power connection to the heater coil may be traced from input terminal L1, closed contacts 220, serially connected and normally closed relay contacts 192, through heating coil 193 and closed contacts 221 to the L1 or N input terminal as the case may be. As hereinbefore described, contacts 192 are under control of relay 190 which is in turn controlled by the operation of control element 189, both of which are connected in series with contacts 220 between the N and L1 power terminals.

While several embodiments of the invention have been described, it will be apparent to those skilled in the art that various modifications thereto can be made without departing from the true spirit and full scope of the invention which are embodied in the appended claims.

I claim:

1. A flat surface heating unit comprising a utensil-supporting cover plate of heat conductive material and having a resistance characteristic dependent on the temperature of the plate, a heating element disposed beneath said plate and adapted to be energized for heating said plate, a pair of elongated spaced conductors affixed to the underside of said plate for measuring the change in resistance of a heated region of the plate, means including a resistive element connected across distal ends of said elongated spaced conductors for testing the continuity of said spaced conductors, and means for operably connecting said heating element so as to be controlled in response to the measured change of resistance of said plate, the resistance of the heated region of said plate being measured and the continuity of said conductors being tested at proximal ends of said elongated spaced conductors.

2. A flat surface heating unit as set forth in claim 1 wherein said spaced conductors are bonded to said plate and parallel to each other.

3. A flat surface heating unit as set forth in claim 1 or 2 wherein said spaced conductors extend through a predetermined region of said plate adapted to be heated and terminate in the distal ends beyond said heated region.

4. A temperature sensor for a glass-ceramic surface heating unit comprising a glass-ceramic heat conductive plate having a resistance characteristic dependent on the temperature of the plate, a pair of elongated spaced conductors affixed to one side of the glass-ceramic plate, a resistor shunting said conductors at distal ends of said elongated spaced conductors, and means connected to proximal ends of said elongated spaced conductors for monitoring the resistance of the glass-ceramic plate between the spaced conductors and for monitoring the continuity of said spaced conductors.

5. A temperature sensor as set forth in claim 4 wherein said spaced conductors comprise a pair of spaced metallized conductors bonded to said plate.

6. A temperature sensor as set forth in claim 5 wherein said spaced conductors extend through a predetermined region of said plate adapted to be heated and terminate in the distal ends beyond said region such that said conductors cross the region of maximum temperature.

7. A temperature sensor as set forth in claim 4 wherein said glass-ceramic plate has a negative temperature resistance characteristic and the ratio of the resistance of said shunt resistor to the resistance of said glass-ceramic between the conductors at the operating temperature of said heated glass-ceramic plate is such that said shunt resistor has negligible effect on the operation of said monitoring means.

8. The temperature sensor as set forth in claim 7 wherein said ratio is greater than 10/1.

* * * * *